(12) United States Patent
Felt

(10) Patent No.: US 10,176,535 B2
(45) Date of Patent: Jan. 8, 2019

(54) METHOD AND SYSTEM FOR PROVIDING SOCIAL CATEGORY INDICATORS IN A USER PROFILE HEADER OF AN ON-LINE POSTING

(71) Applicant: Verizon Patent and Licensing Inc., Arlington, VA (US)

(72) Inventor: Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 551 days.

(21) Appl. No.: 14/478,635

(22) Filed: Sep. 5, 2014

(65) Prior Publication Data
US 2016/0070453 A1 Mar. 10, 2016

(51) Int. Cl.
| | | |
|---|---|---|
| G06F 3/048 | (2013.01) | |
| G06Q 50/00 | (2012.01) | |
| H04L 29/08 | (2006.01) | |
| G06F 3/0481 | (2013.01) | |
| G06F 3/0482 | (2013.01) | |
| G06F 3/0484 | (2013.01) | |
| G06Q 10/00 | (2012.01) | |

(52) U.S. Cl.
CPC ............ *G06Q 50/01* (2013.01); *G06F 3/048* (2013.01); *G06F 3/0482* (2013.01); *G06F 3/04817* (2013.01); *G06F 3/04842* (2013.01); *G06F 3/04847* (2013.01); *G06Q 10/00* (2013.01); *H04L 67/02* (2013.01)

(58) Field of Classification Search
CPC . G06F 3/04817; G06F 3/04842; H04L 67/02; G06Q 30/0269; G06Q 50/01
See application file for complete search history.

(56) References Cited

U.S. PATENT DOCUMENTS

| | | | |
|---|---|---|---|
| 9,449,302 B1* | 9/2016 | Marantz | G06Q 10/10 |
| 2004/0039814 A1* | 2/2004 | Crabtree | G06F 17/30867 709/224 |
| 2006/0036951 A1* | 2/2006 | Marion | G06F 21/31 715/733 |
| 2006/0287096 A1* | 12/2006 | O'Kelley, II | A63F 13/12 463/42 |
| 2009/0271735 A1* | 10/2009 | Anderson | G06F 9/451 715/815 |
| 2010/0205545 A1* | 8/2010 | Dawson | G06Q 10/107 715/758 |

(Continued)

*Primary Examiner* — Kieu D Vu
*Assistant Examiner* — Roberto Borja

(57) ABSTRACT

A user is allowed to include of social category indicators in a user profile header of an on-line posting. In response to answers to questions presented by a social category application executing on a user terminal device or a system, characteristics of a user's interests or personal traits may be determined. Using the characteristics, social category indicators are generated that include a symbol for presentation with a user profile header in a message board of a webpage. The social category application may interact with the provider website/application to substitute the social category user profile header for a standard user profile header of the webpage, so that the indicators appear on the message board(s) as part of the user's postings. The indicators in the social category user profile header allows user to more effectively identify persons with similar interests and backgrounds without engaging in lengthy text exchanges with other persons.

20 Claims, 9 Drawing Sheets

(56) References Cited

U.S. PATENT DOCUMENTS

| | | | | |
|---|---|---|---|---|
| 2010/0281364 | A1* | 11/2010 | Sidman | G06F 17/30595 715/713 |
| 2010/0318571 | A1* | 12/2010 | Pearlman | H04L 63/104 707/784 |
| 2011/0060994 | A1* | 3/2011 | Maxwell | G06F 3/147 715/730 |
| 2012/0136941 | A1* | 5/2012 | Howes | H04L 51/14 709/206 |
| 2012/0290977 | A1* | 11/2012 | Devecka | H04W 4/206 715/810 |
| 2013/0159919 | A1* | 6/2013 | Leydon | G06F 3/0236 715/780 |
| 2013/0174095 | A1* | 7/2013 | Dayan | G06F 17/30882 715/835 |
| 2013/0282806 | A1* | 10/2013 | Steinberg | G06Q 50/01 709/204 |
| 2014/0019872 | A1* | 1/2014 | Yun | G06F 3/0482 715/744 |
| 2014/0372861 | A1* | 12/2014 | Lawless | G06F 17/243 715/224 |

\* cited by examiner

100

METHOD AND SYSTEM FOR PROVIDING SOCIAL CATEGORY INDICATORS IN A USER PROFILE HEADER OF AN ON-LINE POSTING

BACKGROUND

In recent years, the use of websites, webpages and/or applications in which people exchange information and post opinions has increased dramatically. Today, a website/application may be not only a place for a person to obtain information but to also provide information or to interact with other visitors to the website/application. For example, a website/application may allow users to post information about themselves, others or events, exchange comments in postings to the respective website/application and the like. Often, each user's postings merely provide information or commentary with a name and/or a profile image. The profile image may be a graphic, a photograph of nearly anything, or the like. The profile image may give some indication of the personality, traits, or social characteristics of the user, but, otherwise, it is difficult to ascertain much information about the user from the user postings.

By knowing more information about the user, another user with similar social interests and characteristics may be more willing to engage with other users that are also posting information or commenting on the website/application.

Hence a need exists for a system that allows users to indicate social interests and characteristics to facilitate more social engagement between users of a website/application that supports user postings.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
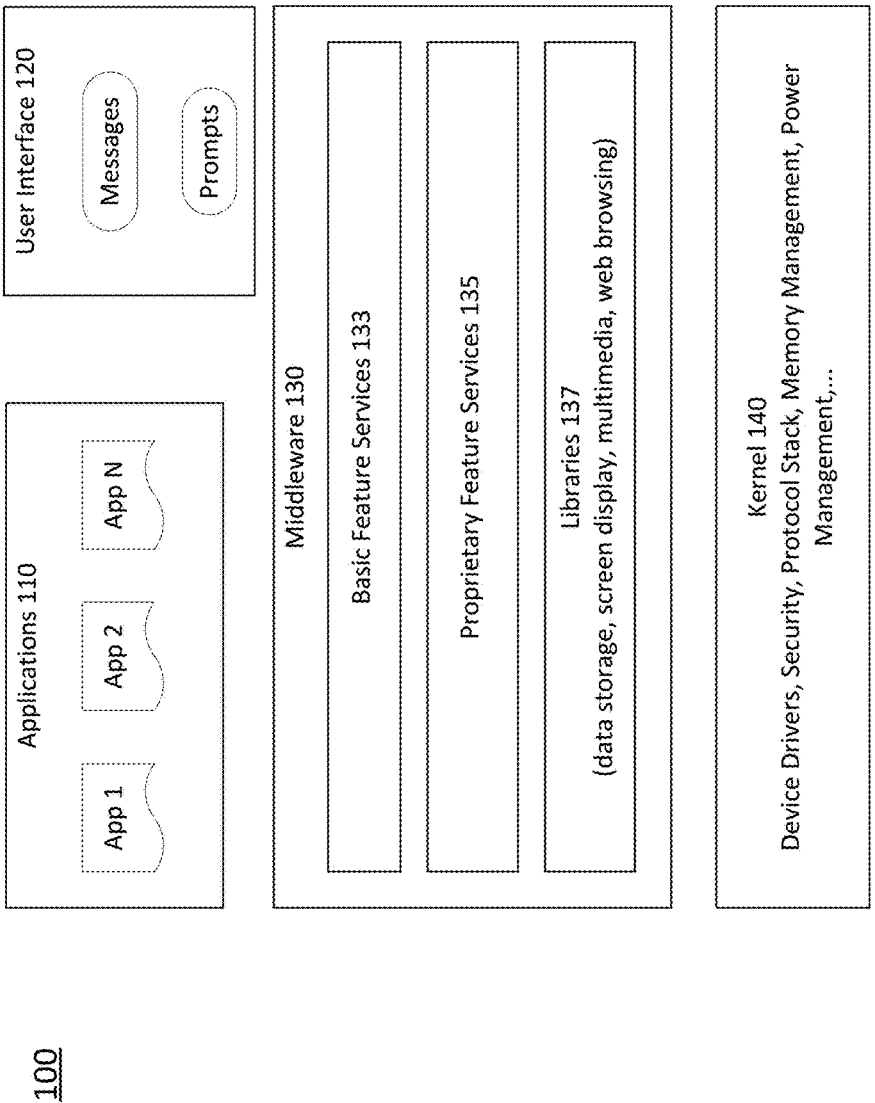
FIG. 1 illustrates a high-level functional block diagram of an example of a software architecture that provides various functions for user terminal devices and support an example of the customized social category indicator service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Our society's culture has become more open, communicative and opinionated as websites/applications and mobile apps that permit social interactions through postings have become more popular. People are no longer shy about sharing their photos and thoughts with others online as perhaps they were in the past when the Internet was less familiar. In fact, app users are bold enough to express even their negative views along with their photo IDs in responses to news articles, in product and store reviews, etc. The proliferation of websites, webpages and applications that allow others to exchange ideas, comments, and indicate their likes and dislikes provides an opportunity for visitors to a websites/application to connect with one another.

For example, the visitors may be interested in discovering people with similar or comparable characteristics to interact with through the respective websites/applications, including Web logs (or blogs), news websites/applications, interest-specific forums, as well as well-known social networks. The respective websites/applications may also be internal to a school, university, company or corporation, or other enterprise or identified community. Each of the respective websites/applications may have the capability to allow users to login to an account established with the respective website/application. The account may be established by providing a valid e-mail address, a user name and a password. The website/application may also permit the user to add further information, such as a graphic that is associated with the user name. Alternatively, a user may login through a social networking website/application that may have partnered with the respective website/application. Upon establishing an account, a user may select a control input presented in a webpage of the respective website/application to post a comment to a message board associated with the presented webpage. In response to selecting the control input, the user may be requested to log into the respective website/application in order to post comments to the message board. Once a user posts to the message board, the post includes a user profile header has user identifying information as well as the substance of the user's posting. A typical user profile header may show a photo of or graphic associated with the user, but there is typically no indication of any information about the user which would make them more interesting and fun. For example, it may be interesting to know if the user is college-educated, an athlete, likes to read, or other similar social information or trait regarding the user.

The various examples disclosed herein relate to allowing users to include social category indicators in a user profile header of an on-line posting to a website/application, and to systems that react to the inclusion of the social category indicators in the user profile header. Websites/applications that allow users to post and respond to comments in postings to the respective websites/applications will be enhanced by applying the examples of a modified user profile header as described herein. The website/application may be provided for social purposes, entertainment, educational, informational or for other purposes. The respective websites/applications may provide webpages that allow users (i.e., visitors) to post comments (containing material related to educational, informational (e.g., news, recipes, product reviews, restaurant reviews), political, reactionary, current events, upcoming events, suggestions, inquiries, and the like) to a message board part of the webpage. The message board of a webpage is any area of a webpage in which user comments are presented when posted. For example, in news-related webpages, a message board containing user profiles and comments is presented at the adjacent to the article, typically at the bottom. Alternatively, in a forum webpage, the entire webpage may be user profiles one after another. Essentially, a message board is any part of a webpage provided by a website or application that presents user postings.

In an example, a social category customization application executing on a mobile device or as part of another user terminal device may present questions to a user. Based on the user's responses to the questions, characteristics of a user's personality (e.g., interests) or social status (e.g., level of education, economic status, job status), or other user traits may be ascertained. The social category customization application, using the ascertained traits or characteristics, generates social category indicators that may include one or more symbols for presentation with a user profile header in a message board posting in a website/application or webpage. In one example, the social category indicators are icons that indicate one or more social characteristics of the user and that are incorporated into a profile header of the user. In order to generate the user's profile header, the social category customization application may have access to a memory that stores a number of social category indicators and a table of characteristics with assigned social category indicators. Based either on a user's selection of a social category indicator (Manual mode) or responses to questions presented by the social category application (Automatic mode), the social category customization application will populate social category indicators into a social category user profile header.

When provided with a posting to a website/application message board, the social category user profile header, the user's indicators will appear in the message board together with the text or other content of the user's posting. The indicators are visible and may be searchable. The indicators allow users to more quickly and more easily identify persons with similar interests and backgrounds without having to ask specific questions or engage in lengthy text exchanges with other persons in the message board of the respective website/application. The user that uploads the posting, however, has control of the indicators provided in their header and may choose to include as few or as many indicators as the particular user desires, for example, to provide desired indications but yet maintain other personal information private.

In another example, application programming interfaces (API) of existing websites or applications that allow postings are used by the social category customization application to substitute the social category user profile header of social category application for the standard user profile header associated with the website or application. For example, a website/application may be related to social networking and may provide an API that allows other programs to manipulate the presentation of some aspects of the website/application content, such as the standard user profile header of the website/application, when the user's postings are presented on the social networking website/application.

In yet another example, a website/application or webpage message board is implemented using hypertext markup language (HTML) to configure a user's posting to the message board. The social category customization application may include functionality that operates as a plug-in to a browser application executing on the same user terminal as the social category customization application. For example, the user terminal browser application when posting a message to the webpage message board supplies, via an API associated with the webpage, social category user profile header HTML code to the webpage. The webpage provides the posting including the social category user profile header HTML code in the message board code that is delivered to other users that access the message board. The other user's browser applications render the HTML code delivered by the webpage including postings to the message board generated via the social category customization application. This feature facilitates use of the social category user profile header with nearly any webpage message board as the social category user profile header HTML code is being provided to the browser application by the webpage as a replacement for the webpage's standard user profile header HTML code. The receiving browser application is able to render the social category user profile header, if the receiving browser includes the plug-in functionality provided by the social category customization application.

In another example, the users may have multiple social category user profile headers that are used depending upon the website/application with which the user is interacting. For example, the social category user profile header may be customizable for the respective website/application, so instead of the same social category user profile header having the same set of social category indicators, the user is able to switch between multiple social category user profiles. For example, the user is able to select a social category user profile header that is most relevant to the content of the website/application. In a particular example, the respective website/application may provide content including message boards, relative to outdoor enthusiasts, when the user wishes to post to the message board, the user selects a social category user profile header with social category indicators representative of mountain bikes, kayaks, fishing or hunting-related user interests. In addition or alternatively, a user setting may be available that is presented via a graphical user interface that allows the user to select from using the same social category user profile header for all message boards or may be presented with an option to select from two or more social category user profile headers. In some examples, the user may personalize the social category user profile header based on different characteristics of the different sets of sites that the user visits. For example, the user may want to emphasize a particular user trait when at one site (e.g., business) and emphasize another trait when interacting on another site (e.g., politics). In a particular example, when the user is opining on a financial investment-related message board, the user may prefer to have a social category user profile header having social category indicators that represent the user's business acumen (e.g., business school, financial status indications and the like). In addition or alternatively, the user may also indicate specific types of websites/applications that are to have specific social category user profiles. For example, the types of websites/applications may be grouped by, for example, social, investment, political, dating or sports. So the user may set the financial investment related social user profile header to be used with the investment-related website/application, while the outdoor sports social category user profile header (with the mountain bikes, etc. social category indicators) is used for the sports-related website/applications.

In a further example, the social category indicators in the social category user profile header may be actionable controls that allow other users to obtain additional information about the user's involvement related to the respective social category indicators presented in the user profile header. For example, a social category indicator may include an underlying hyperlink to another page in the respective website/application, or to a separate website/application related to the social category indicator.

The social category indicators, in another example, may be used in a business environment, such as an employee forum, that allows for not only the sharing of business-related information, such as presentations, interesting links to business-related news, such as stock prices or product launch, to technology, or any other information, for that matter. In the example, the employees may all have user profile headers that require a user to select a non-zero minimum number of social category indicators from broad groups. In an example, any user, not just employee users, may select one or more social category indicators to include in their user profile headers. In the employee context, for example, a user may have worked in multiple divisions of a corporation, the user may select social category indicators for their user profile based on the divisions in which the user worked, or based on the user's education. The selected social category indicators are presented when the user posts any presentation or responds to comments. For example, this feature allows users to not only see social categories of other employees, but also provides an opportunity to reach out to the other user's in other social contexts. For example, a social category indicator may indicate a university of which the user is an alumnus, and other alumni of the same university may see the social category indicator and contact the other user based on the indicated alumni status. In businesses that have multiple offices in different geographical locations, such a means of connecting is beneficial so relations throughout the business may be established by presentation of common social category indicators in the user profile header.

Reference now is made in detail to the examples illustrated in the accompanying drawings and discussed below.

FIG. 1 illustrates an example of a software architecture for implementing the customization of social categorization profile headers described herein. The software architecture 100 includes code related to applications 110, user interfaces 120, middleware 130 and a kernel 140. The applications 110 include proprietary applications such as App 1, App 2 . . . App N. The user interfaces 120 include a graphical user interface provided by the user terminal as well as the respective applications 110. The middleware 130 includes basic feature services 133, proprietary feature services 135, and libraries 137. The libraries 137 may include information related to one or more of data storage, screen display, multimedia, or web browsing. The proprietary feature services 135 may be those feature services provided by the user terminal device manufacturer, a partner of the user terminal device manufacturer, a wireless service provider (cellular or other, such as Wi-Fi), or the like. The kernel 140 includes device drivers, security information and algorithms, protocol stack, memory management, power management and the like. The functions provided by the kernel 140 may be considered native to the user terminal. A processor within a user terminal may access the different components of the software architecture 100 to provide various functions such as the social category customization service as described herein. The processor and various provided functions will be described in more detail with reference to the following examples.

Of the applications 110, such as applications App1, App2 . . . App N (where N is an integer), may also be applications such as an example of the social category customization application, social networking applications, links to social networking portals, navigation, hands-free calling, dialing assistance, games, productivity applications, news (e.g., stock, national periodicals, local periodicals) applications, or the like. The applications 110 may be stored in the memory (not shown) of the user terminal at the time of manufacture, when provided by a wireless service provider (e.g., cellular or other), or when downloaded by the user from the Internet or some other network.

In some examples, the user interface 120 provides messages for the basic operation of the mobile device or for use with applications, such as a game or the like. For example, the user interface 120 may be a touchscreen display that allows for the presentation of a graphical user interface (both of which are described in more detail with reference to other examples). In other examples, the user interface 120 may be a combination of input and/or output devices, such as a keyboard, a display, a microphone and/or speakers. The respective applications may allow for or provide their own graphical user interfaces based on the application programming.

Middleware 130 provides feature services and libraries 137 that are more closely integrated with the operating system (OS) of the user terminal device. In other words, the OS interacts with these feature services and libraries to provide functionality that is more closely integrated with the operation of the user terminal device than the applications 110. "Closely integrated" means that a respective feature service may operate even when a user has not selected an icon for active interaction with the respective feature service, while a library is typically unavailable for interaction by the user other than perhaps some settings (e.g., selection of data storage settings, selection of default browser, parental controls for multimedia, or the like). However, in response to commands from the processor via the OS, different feature services may be provided to the user of the user terminal device.

Generally, the kernel 140 provides functions, such as device drivers (e.g., BLUETOOTH headsets, keyboards, headphones and the like), protocol stack management, memory management (e.g., allocating memory for use by applications 110, power management and the like, that allow for operation of the user terminal device. In some examples, the kernel 140 is responsible for receiving inputs that change the brightness on a display device, accepting other inputs and outputs for changing functions and the like. While the applications 110, the user interface 120, and different proprietary feature services 135 may be provided based on the respective trigger, the kernel 140 is largely unaffected in response to the user's revisions to their social categories.

Figure 2A:
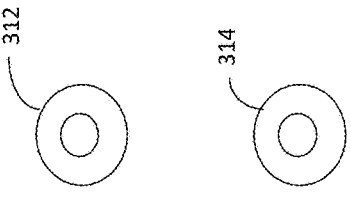
FIGS. 2A and 2B illustrate examples of prompts or screens presented via a graphical user interface of a user terminal device during the execution of the social category customization application by the user terminal device processor.
Figure 2B:
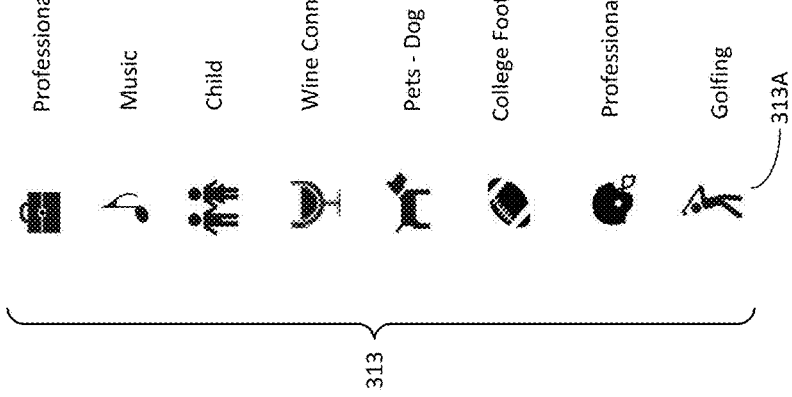

FIGS. 2A and 2B illustrate examples of graphical user interfaces presented on a user interface hardware by a processor of a user terminal device. The examples of FIGS.

2A and 2B illustrate prompts generated by the social category customization application.

In an example, a user registers with the social category customization application. The registration information is stored in a server, such as application server 31 provided by a cellular service provider or by a third-party application server, such as application server 25 of FIG. 4. Referring to FIG. 2A, after a user registers on the social category customization application, a prompt 306 may be presented via a graphical user interface 305 on user interface hardware, such as a display or touchscreen. The prompt 306 may present information on the graphical user interface 305 as well as control inputs 312 and 314. The control inputs 312, 314 may be locations within the graphical user interface 305 that, when selected by a user input made via a user input device, causes the social category customization application to respond to the selected control input. For example, the prompt 306 presents to a user via the graphical user interface 305 a choice between allowing the social category customization application to select, which is referred to as automatic mode, the social category indicators for inclusion in the user's social category user profile header by selection of control input 312, or, allowing the user to manually select the social category indicators (i.e., manual mode) for inclusion in the user's social category user profile header upon selection of control input 314 of FIG. 2A.

In response to selection of control input 314 by a user, a screen, such as screen 307, as shown in FIG. 2B may be presented via the graphical user interface 305. In the example, in response to selection of the control input 314, the social category customization application (under control of a user terminal processor) responds by presenting screen 307 in the graphical user interface 305 that is different from the prompt 306. The screen 307 may present instructions 309 that allow the user to manually select the social category indicators 313 that will be incorporated into the user's social category user profile header. The social indicators 313 may be presented in a menu format, and each of the social category indicators 313 may be selectable via a user input (i.e., by substantially touching in a touchscreen or placing a cursor on/over the respective social category indicator) to the graphical user interface 305. For example, a user may wish to incorporate the golfer social category indicator 313A into their social category user profile header. To select the golfer social category indicator 313A for incorporation into their social category user profile header, the user selects the golfer social category indicator 313A with an input device or touch to the graphical user interface 305. Note that the social category indicators 313 are shown as graphic icons, but the respective social category indicators 313 may also be textual, thumbnail images of representative scenes (e.g., a photograph of the user actually golfing), or the like.

Alternatively, in response to a user selection of control input 314, the social category customization application presents other screens that lead the user through different steps for selecting social category indicators, such as social category indicators 313. In this example, instead of a menu, a series of questions are presented to the user via a user graphical interface, such as from user interface 120 and/or the graphical user interface 305 of FIG. 2A or 2B. The series of questions relate to a number of social categories, such interests (e.g., sports, indoor activities (gaming, travel, cooking, reading, television, music, crafts, or the like), demographics (e.g., gender, age group, interests, education, national origin, family info (children/no children), economic status, political affiliations, and the like), school information, and so forth. Of course, a user can provide more or less information in response to the questions related to any social category, and the social category application provides the user with the ability to opt in or opt out of sharing of any information provided to the application with any other user or any entity (including a cellular service provider, wireless service provider, any third party administrator of a third party application server or the like).

In an example of the automatic mode of the social category selection process, a user may be presented with a number of questions the answers to which are analyzed according to an algorithm and a social category indicator is selected based on results of the algorithmic analysis. The algorithm may range from the simple (if the response is YES to a question of Do you like sports? select the sports social category indicator) to the complex (responses are weighted and based on a threshold score for questions related to sports, the sports social category indicator is selected). Of course, other algorithms may be implemented and depending on the user different algorithms may be applied. For example, a user may have a non-business social category user profile header and a business social category user profile header.

In an example of an automatic mode selection process, if the user responds to the questions, the social category customization application may select social character indicators based on the user's responses. For example, a question may ask the user if they are a sports fan, if the user responds "Yes," a follow-up question may ask which sport is the user's favorite. If the user responds by inputting "baseball," a social category indicator may be a graphic that resembles a baseball or some other indication of the user's preference of baseball as a sport. If the user likes all sports equally, a generic sports social category indicator (e.g., a football-shaped icon or baseball-shaped icon) may be selected by the Social category customization application. Another alternative to the user responding to questions, the user may be presented with a menu that includes all of the social category indicators available. From the menu, the user may directly select social category indicators for inclusion in the user's profile header. In another example, the user may answer some of the presented questions based upon which the application selects social category indications, and in addition, the user directly selects social categories for inclusion in the user profile header.

The user, while in automatic mode, may choose not to answer a question but may directly select a social category indicator related to the subject of the question. Alternatively, while in manual mode, the user may not be able to decide which social category indicator to choose and may choose to enter automatic mode for the respective social category indicator selection. A screen in the graphical user interface 305 may present the options to switch between the automatic and manual modes.

In addition, the social category indicators may include colors that represent a user trait. For example, color may be used to classifications within a social category, such as beginner to expert, young to old or the like. For example, a color coding scheme may represent the following: Green: beginner; Blue: mid-level; Gold: established; Platinum: privileged; and Black: elite. Of course, other examples may also work, such as for education, where, for example, green indicates a high school diploma, blue indicates a college degree, silver indicates a medical degree, yellow indicates a law degree, and black indicates a doctorate degree. Alternatively, the respective colors may indicate an amount of experience, such as Green: 1 year, Blue: 5 years, Gold: 10 years, Platinum: 15 years, and Black: 20+ years, or the like.

The number of social category indicators for inclusion in the social category user profile header may be limited to a few, such as 3-5, but the user profile header may include actionable controls that allow an interested viewer at a message board to see a more detailed listing of the social category indicators that apply to a user. This and other details of the user profile header will be described with reference to FIG. 2C.

Figure 2C:
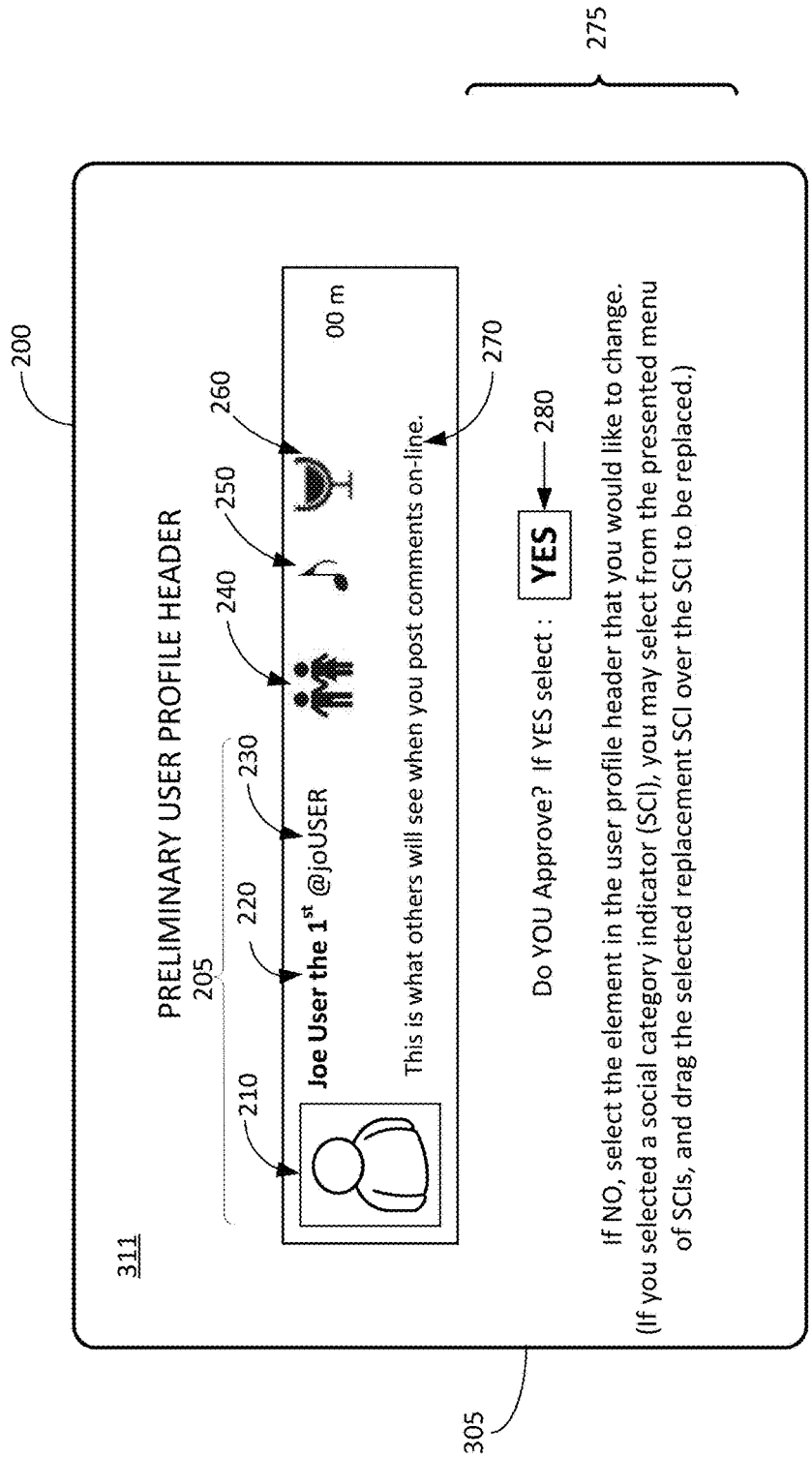
FIG. 2C illustrates an example of a presentation of a preliminary user profile header provided on a display device for a customized social category indicator service through a network/system like that shown in FIG. 4.

Upon selection of the social category indicators by the social category customization application based on the user response to the questions, by the user directly without answering the questions, or by a combination of both the automatic mode and the manual, the social category customization application causes a preliminary user profile header containing the selected category indicators to be presented in a user interface for user approval or acceptance. FIG. 2C shows an example of a preliminary user profile header and application prompts for approval of the user profile header. The preliminary user profile header 200 of FIG. 2C includes a user indicator 205, which, for example, includes one or more of a user graphic 210, a user name 220, a user identifier 230; a social category indicators 240-260, and an indication 270 of the look of a user posting message. The selected social categories 240-260 are presented adjacent to the user's user name 220 and user identifier 230 in the preliminary user profile header 200.

Before continuing with a final discussion of the example user social category indicator selection, the elements of the preliminary user profile header 200 will be described in more detail. The user graphic 210 is a graphic that is inserted into the preliminary user profile header 200 by the user. The user graphic 210 may be an image, such as a photograph (e.g., a photograph of the user, a car, a city or the like); a graphic such as drawing (e.g., sports team logo), or some other graphic that is associated with the user. The user graphic 210 may also be a default image provided either by the social category customization application or the respective website/application. The user name 220 is, for example, a nickname that the user wants to be identified by when interacting in the respective website/application. The user identifier 230 is the address of the user within the respective website/application. Other users within the respective website/application may use either the user name or the user identifier to contact the user associated with the preliminary user profile header 200. The social category indicators 240-260 are different icons, symbols, graphics or text-based indications of a social category. The details of the social category indicators and a user's interaction with the social category user profile headers will be described in more detail with reference to FIGS. 3A and 3B, and the social category indicators 340-360 illustrated therein.

Returning to the discussion of the user social category indicator selection example, the user is presented with an option 275 to approve or modify the preliminary user profile header 200. If the user approves of the preliminary user profile header 200, the user selects the "YES" button 280. Alternatively, if the user disapproves, the user selects an element from elements 210-270 that the user wants to change by interacting with the graphical user interface 305 of the device. The user after selecting an element from elements 210-270 is presented with a number of options (not shown) to revise the preliminary user profile header. For example, the order of the selected social categories as presented adjacent to the user name, the individual social category indicators, the appearance (e.g., color, intensity or other aspect of the appearance) of the social category indicators, or the like may be modified, substituted or removed by user interaction with the graphical user interface 305. For example, a user may choose to change the individual social category indicators by deleting one or more of the social categories to reduce the number of social categories presented in the user profile header or other social categories are substituted for the social categories that the user wishes not have be displayed. In this example, the user follows the instructions presented in option 275 to select any of the elements 210-270 for change or modification via a drag and drop action. In an example, the user may wish to change one of the social category indicators 240-260. In response to a selection of one of the social category indicators 240-260 in the preliminary user profile header 200, a menu of social category indicators may be presented to the user, who may then via a drag and drop operation replace the selected social category indicator. Of course, other user operations may also be used. For example, the user may be able to customize the font used in the user posting 270 indication via a similar operation. In other words, the user selects element 270 and a menu of fonts is provided in the graphical user interface 305 from which the user may make a selection. Upon selection of a font, the font of the user posting 270 is changed to the font selected by the user.

In another example, while three social category indicators 240-260 are shown in the example of FIG. 2C more or less social category indicators may be selected by the user for inclusion in the social category user profile header. In addition, as mentioned above, a user may select different social category user profile header for use with different types of websites/applications. In which case, the social category user profile header may have more or less social category indicators based on the user's preferences for a particular type of website/application. For example, the user may be an alumnus of the country's top engineering school, so for all technical websites/applications, the user may only have the social category indicator of alumnus of the engineering school, while for a cooking website/application, the user may have multiple social category indicators included in the user's social category user profile header indicating the user's interest in French cuisine, French wine and Belgium chocolate.

The accepted or approved preliminary user profile header 200 is stored in a memory (not shown) associated with the user terminal (not shown) as a social category user profile header. For example, upon acceptance or approval by the user, the social category customization application may generate HTML code usable by the user terminal browser application for rendering the accepted or approved social category user profile header. The social category user profile header is used for any and all webpages or website/applications that the user terminal device accesses for message board postings. In a further example, the user generates multiple customized preliminary user profile headers that are tailored for use with different types of website/applications or webpages, such as a business-related (e.g., occupation, company name, employer name, years of experience, other resume-like information) preliminary user profile header that only has business-related social category indicators, an activities-related (e.g., camping, sports, leisure and the like) preliminary user profile header that only has activities-related social category indicators, a personal-related (e.g., gender, relationship status, number of children, age, date of birth, place of birth, and the like) preliminary user profile header that only has personal-related social category indicators or the like. The user may accept or approve the respective customized preliminary user profile headers as a number of alternative social category user profile headers. In which case, the user has multiple social category user profile headers. All of the multiple social category user profile headers may be stored in memory of a user terminal device. Subsequently, when a user wants to make a posting to a particular website/application or webpage message board, the social category customization application may generate a prompt presented via the graphical user interface for the user to select a specific social user profile header from the multiple social category user profile headers available to the user. This feature is particularly useful when a user has not visited a website/application previously and wishes to make a posting. In this manner, the user dictates the social category user profile header information that will be provided in the posting. In another example, the user may choose to use one of the stored, multiple social category user profile headers or may select a control input presented by the social category customization application presented in a graphical user interface to create a new social category user profile header for making a posting to a message board of a webpage.

In a further example, the social category customization application may be configured to maintain a history of the use of the respective social category user profile headers with particular website/applications or webpages, and may automatically select the respective social category user profile headers for use when posting to the particular website/application's or webpage's message board.

A benefit of the present examples is that while the user graphics may show a photo of the user, there is no indication of any information about the user which would make them more interesting and fun. The social category customization application allows a user to generate a user profile header that is more informative to readers of the user's postings and commentary. The social category indicators, in some examples, are displayed adjacent to the user's ID in the social category use profile header. For example, readers of a message board may be interested in discovering people with similar or comparable characteristics to interact through various types of website/applications or blogs. The social category indicators provide the reader with an indication of the context of posting user's commentary. For example, a dog owner may have a different opinion of dog food than a user who owns only cats. Or, a user interested in running may have a different opinion of an athletic shoe than a user that is a weightlifter. In addition or alternatively, a social category indicator may be provided that indicates that the person has children or a child. An example of locating others with similar interests is described in more detail with reference to FIGS. 3A and 3B.

Using the social category customization application can help readers to identify and get attracted to people whom they find interesting through the information revealed by their ID Social category customizations, or know their basic characteristics and status beforehand, so that they can decide on how to interact with them.

Figure 3A:
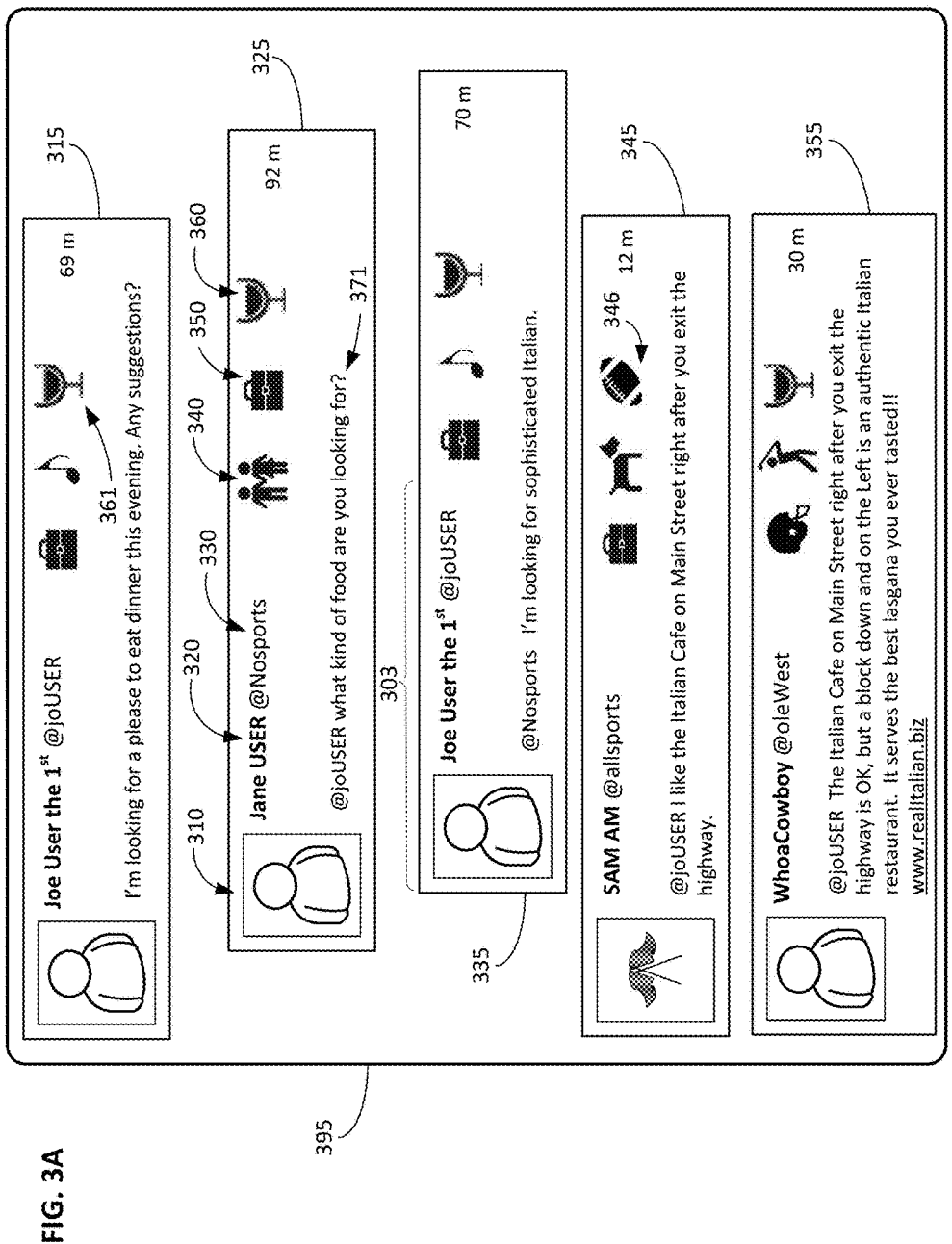
FIGS. 3A and 3B illustrate examples of a presentation of a social category user profile headers as provided by the customized social category indicator service of the social category customization application through a network/system like that shown in FIG. 4.

An example of a series of postings that utilize the social category user profile headers described above is illustrated in FIG. 3A. FIG. 3A illustrates an example of a series of postings 315-355, for example, in a message board of a webpage, that incorporate the social category indicators 340-360 described herein as well as the user graphic 310, the user name 320, and the user identifier 330.

The graphical user interface 395 may be a display screen of a mobile device, a laptop, a personal computer, smart television or other user terminal that presents the message board postings 315-355. Each of the postings 315-355 includes a user profile header that incorporates textual commentary 371. The postings 315-355 include elements similar to the elements 210-260 in preliminary user header profile 200. For example, posting 325 includes a user indicator 303 that has one or more of a user graphic 310, user name 320, user identifier 330; and social category indicators 340-360. As mentioned above, the user category indicators 340-360 will be described in more detail with reference to FIGS. 3A and 3B. Of course, in some examples, the user profile header may include more or less elements. For example, user identifier 330 or user graphic 310 may be omitted in some postings, while only user identifier 330 is omitted in another posting in a different webpage.

Returning to the example of FIG. 3A, in the example postings, posting 315 using the user profile header of "Joe User the $1^{st}$" requests suggestions of places to eat. The social category indicators 340-360 of posting 315 represent different traits of "Joe User the $1^{st}$," such as a professional (indicated by the briefcase), likes music (indicated by the musical note), and likes wine connoisseur (indicated by the wine glass). In response to the request in posting 315, the message board posts posting 325 from "Jane User." In posting 325, the textual comment 371 further solicits more information from "Joe User the $1^{st}$" to narrow his taste in food. As shown in posting 325, "Jane User" has social indicators 340-360, which indicate traits of "Jane User," such as having children (340), a professional (350) and also likes wine connoisseur (360). In posting 335, "Joe User the $1^{st}$" responds indicating his preference for "burgers, steak or chicken." Another user, "Sam Am" begins to participate in the discussion by posting his suggestions in posting 345. The social category user profile header of "Sam Am" indicates he/she is a professional (indicated by the briefcase), has a pet (indicated by the dog, which may also indicate the pet is a dog), and likes college football (indicated by the football). Another user, "WhoaCowboy" posts in posting 355, his response to not only "Sam Am" but also to "Joe User the $1^{st}$"'s request. Note that the textual commentary in posting 355 includes not only text, but also a hyperlink to a restaurant that is being suggested. The hyperlink may not only be a link to a webpage, but also be a link to a video, audio, other media content or the link. The social category indicators in "WhoaCowboy"'s social category user profile header include a football helmet (indicating an interest in professional football), a golfer (indicating an interest in golf), and a wine glass (indicating an interest in wine). Although only five postings are shown, it is envisioned that more or less postings are possible and the number of postings is limited only by the number of postings a message board will permit or a number that a browser application is capable of presenting on a user terminal.

The social category indicators, in some examples, are displayed adjacent to the user's ID in the social category use profile header. The readers may be interested in discovering people with similar or comparable characteristics to interact through various types of website/applications or blogs. Social app IDs show a photo of the user, but there is no indication of any information about the user which would make them more interesting and fun.

Using the social category customization application can help readers to identify with people whom they may find more interesting through the information revealed by their social category customizations.

Figure 3B:
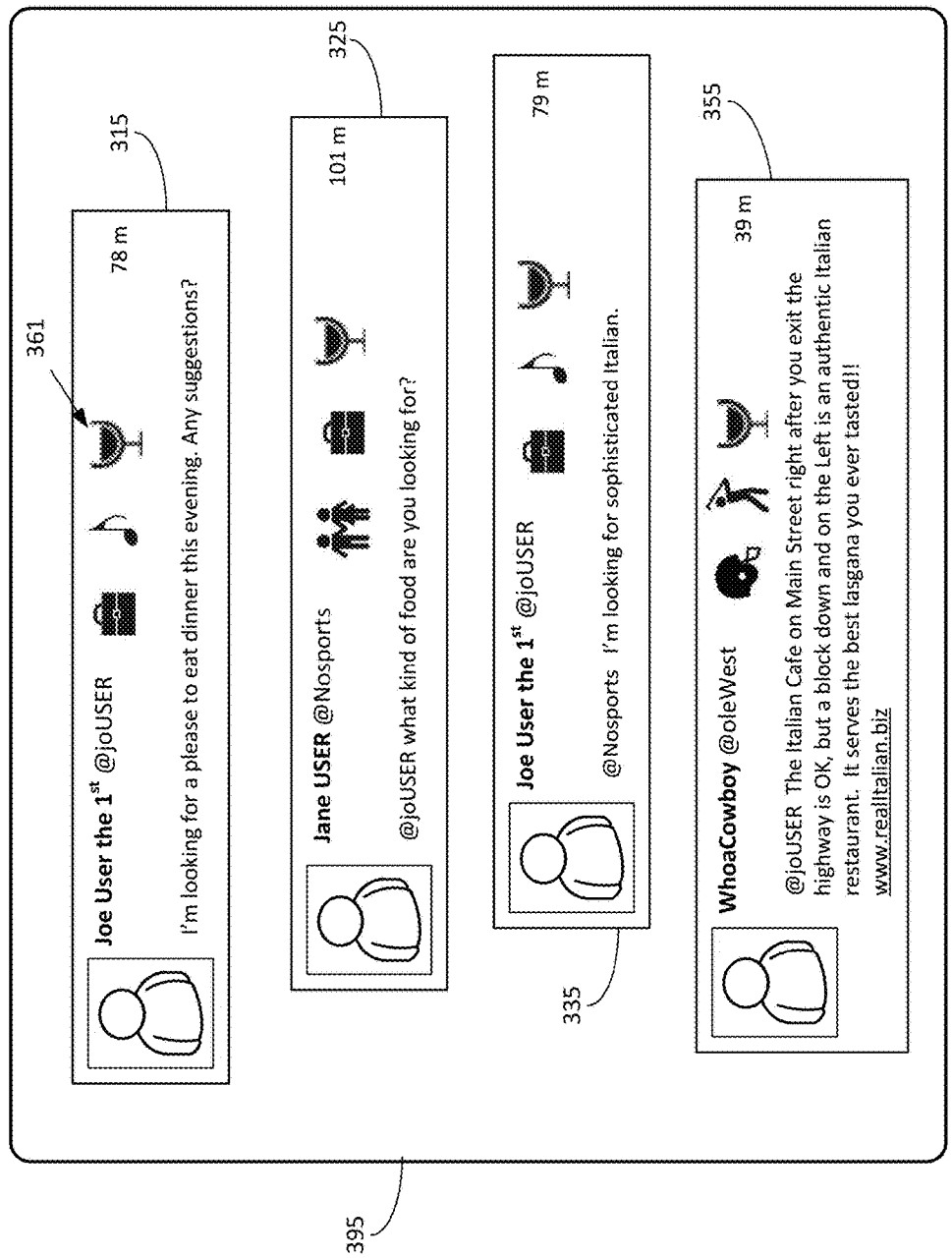

In the example of FIG. 3A, "Joe User the $1^{st}$" may now question whether the recommendation of the first restaurant by "SAM AM" in posting 345 is based on a knowledge of food and cooking. So "Joe User the $1^{st}$" may interact with the graphical user interface 395 of his user terminal by selecting the social category indicator 361 (i.e., the wine glass) in posting 315. In response to the selection of the social category indicator 361 via a user input to the graphical user interface 395, a social category type of the social category indicator is determined by the social category customization application based on an indication of the social category indicator selected via a user input to the graphical user interface 395. Upon determining the social category type, the message board is filtered to provide a message board containing only postings that contain the type of social category indicator (i.e., the wine glass) selected by the user as shown in FIG. 3B. Filtering based on the social category indicator 361 that is representative of users interested in food or cooking provides "Joe User the $1^{st}$" with only the recommendations or comments from those having a similar interest in food or cooking. In other words, only postings 315, 325, 335, and 355 are shown, and posting 345 is removed from the presentation of the message board in graphical user interface 395. "Joe User the $1^{st}$" may also have performed a similar filtering by selecting in his posting 315, the briefcase (i.e. professional) social category indicator.

As a result of being able to filter postings through the selection of a social category indicator, users are able to see what other users with similar interests have posted to the message board. While the above example, the described the selection of a social category indicator within the user's own posting, it is envisioned that a user may select any social category indicator in any posting (i.e. their own posting or any other user's posting) in the message board to filter the postings. So returning to FIG. 3A, "Joe User the $1^{st}$" may have selected social category indicator 360 in posting 325, and the message board postings would have been filtered to present a filtered message board as shown in FIG. 3B.

When filtering is performed a user's own postings to the message board are not filtered from the graphical user interface 395 on the user's own user terminal. So returning to FIG. 3A, "Joe User the $1^{st}$", for example, may wish to see what restaurants those who have social indicators that indicate an interest in college football (i.e., the football-shaped social category indicator) have recommended. In the example, "Joe User the $1^{st}$" may select the social category indicator 346. In response to the selection of social indicator 346, the graphical user interface 395 presents a message board that only includes postings 315, 335 and 345. Postings 315 and 335 are presented because those are "Joe User the $1^{st}$'s" postings, and posting 335 is the only presented posting that includes a social category user profile header containing a social indicator 346. After filtering, "Joe User the $1^{st}$" may continue exchanging postings with only the users that have the same interest in wine connoisseur as indicated by the wine glass social category indicator.

Other functionality of the social category indicators is also envisioned. For example, the social category customization application may provide users with a prompt or menu, prior to generating a posting, to select to post messages to user's that have a specific social category indicator. For example, in FIG. 3A, "Joe User the $1^{st}$" posted his inquiry regarding restaurants to any user of the message board. However, in the present example, "Joe User the $1^{st}$" prior to posting his inquiry may have limited the users to whom his posting would be viewable by selecting a social category indicator from the prompt or menu containing a listing of social category indicators. In such a case, the example illustrated in FIG. 3B is the view of the message board that all users (i.e., Joe User the $1^{st}$, Jane User and WhoaCowboy) would be presented with on their respective user terminals.

The presentation of the social category user profile header in the respective message board postings may be accomplished in a number of different manners. For example, the webpage may operate with a social category customization application as an extension or as a plug-in. For example, with regard to FIG. 3A shows the graphical user interface 395 may be controlled by execution of program code associated with the website/application that provides an API for use of the user profile headers provided by the social category customization application. The social category customization application may be incorporated into the respective website/application, such as a social networking website/application or application, or may operate as a stand-alone application. When incorporated into a social networking website/application, the social category customization application may execute, for example, as an extension of the social networking website/application. In this case, the registration and presentation of social category indicator selection questions appears to the user simply as another function of the social networking website/application.

In an example of an implementation, the social category customization application functions separately and interacts with a social networking or other website/application (e.g., informational forum, news article, or any website/application or webpage that permits user postings) via an API of the social networking website/application. By using an API of the existing social networking or other website/application, the social category customization application is able to substitute the user profile header for a standard user profile header typically associated with the social networking or other website/application. For example, a social networking or other website/application may be related to social issues and may provide an API that allows other programs to manipulate the presentation of some aspects, such as the user profile header, of the social networking or other website/application. In more detail, each user terminal that has a social category user profile header and that is posting to the message board shown in FIG. 3A, for example, indicates to the web page hosting the message board that the respective user's social category user profile history should be used in the user's respective postings.

Note that the message boards of FIGS. 3A and 3B only show social category user profile headers, but users that do not have the social category customization application or have not registered (e.g., created a user account and generated a social category user profile header) with an application server hosting the social category customization application will still have user profile headers presented that are the standard user profile headers for the webpage. In other words, the users with the standard user profile headers will not have the additional functionality provided by the social category customization application.

The social category customization application service provided herein also may be implemented via a networked environment as discussed below with respect to FIG. 4.

Figure 4:
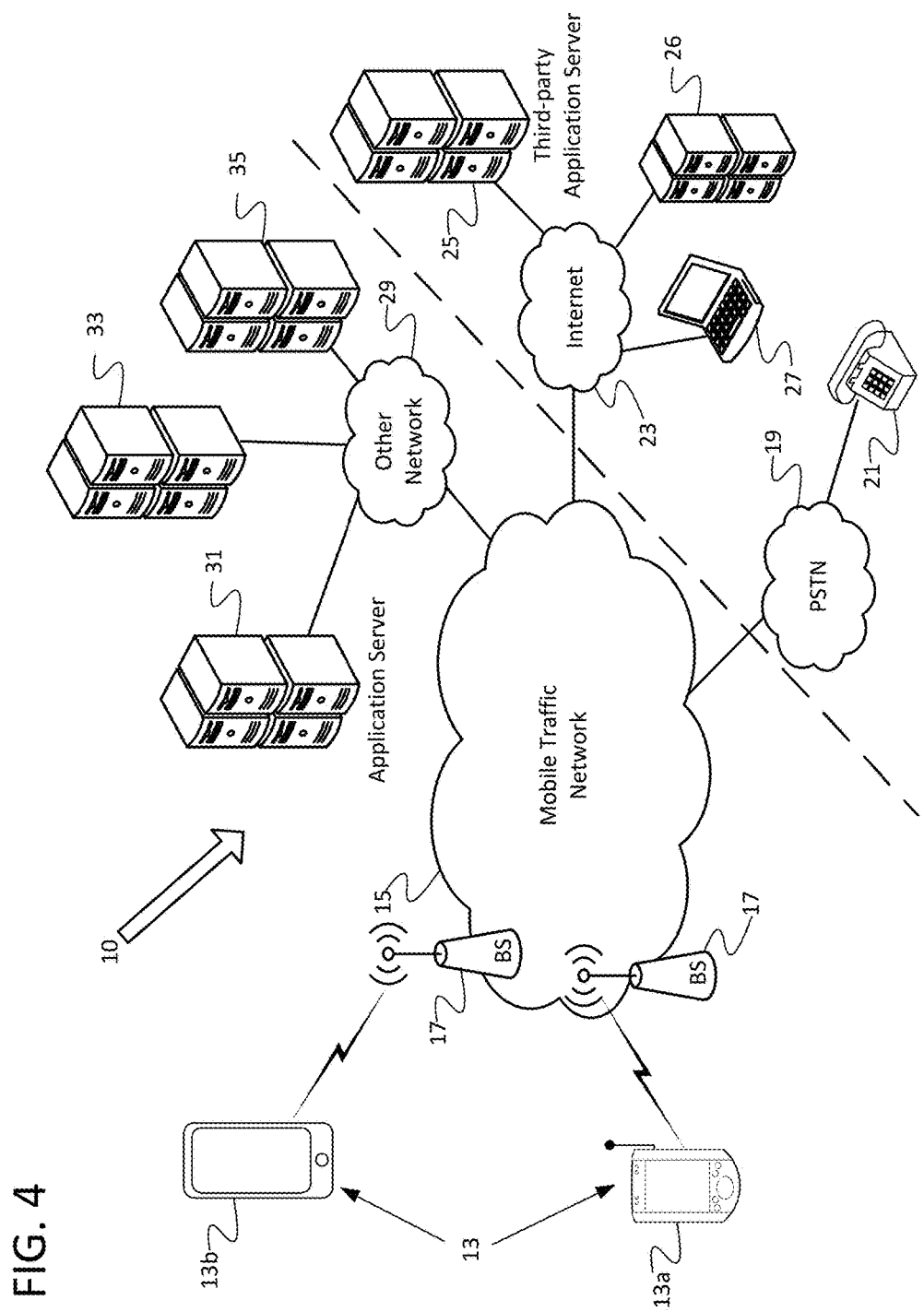
FIG. 4 is a high-level functional block diagram of an example of a system of networks/devices that provide various communications for user terminal stations and support an example of the customized social category indicator service.

FIG. 4 illustrates a system 10 offering a variety of application services, including communications for providing social category customization application functionality and message board-related websites/applications and content to mobile and fixed-location user terminals. The example shows simply two user terminals 13a and 13b as well as a mobile communication network 15. The stations 13a and 13b are examples of user terminals that may be used for the social category customization application service. However, the network will provide similar communications for many other similar users as well as for mobile devices/ users that do not participate in the social category customization application service. The network 15 provides mobile wireless communications services to those stations as well as to other mobile stations (not shown), for example, via a number of base stations (BSs) 17. In some examples, the present techniques may be implemented in any of a variety of available mobile networks 15 and/or on any type of mobile station compatible with such a network 15, and the drawing shows only a very simplified example of a few relevant elements of the network 15 for purposes of discussion here. In other examples, the present techniques and examples may be implemented in any of a variety of available data networks such as Internet 23 or other networks 29. For example, other network 29 may be an intranet within an enterprise. The enterprise users may participate in message board that permits the exchange of ideas related to not only work, but to social activities as well. The described social category customization application, when implemented in an intranet environment, allows enterprise users to engage one another at a deeper level than simply work. For example, an enterprise accountant may have an interest in user terminal user interfaces, which to an enterprise engineer responsible for user interface design may be a person that the engineer would like to talk to about the accountant's experience with a particular user interface. Or, the engineer may be interesting in a certain activity, such as sailing, and the enterprise accountant may have a sailing social category indicator presented on their social category user profile header within a forum presented to all users within the enterprise via the intranet 29.

In the above described enterprise user example, the enterprise users will likely have the social category customization application installed on a user terminal such as laptop PC type user terminal 27. In such an example, the functionality described with respect to FIGS. 2A-3B is also, or alternatively, available on the user's laptop PC. The user when using the social category customization application via the laptop PC user terminal 27 is able to make postings to message boards provided by respective webpages or websites/applications. In an example in which the user also utilizes their mobile device, such as 13a or 13b, to post to message boards, the user may desire to have social category user profile headers that are maintained on the laptop PC user terminal 27 available to their mobile device (e.g., 13b). In such a case, the user's social category customization application executing on the mobile device may be configured to synchronize the social category user profile headers maintained on the mobile device 13b with the social category user profile headers maintained on laptop PC 27. For example, the user may maintain a business-related social category user profile header on laptop PC 27 because the user primarily uses the laptop PC 27 to make such business related postings. However, the user may desire to also have the business-related social category user profile header to their mobile device 13b because the user will be traveling, or some other reason. The social category customization application may include functionality to synchronize the social category user profile headers on each device, for example, when both devices are connected to the same network via wireless communication, such as Wi-Fi or the like. In another example, the application server 31 or 25 may maintain a collection of a user's social category user profile headers. A user is able to access (assuming appropriate authentications and authorizations) the social category user profile header collection from any device executing the social category customization application and download one or more of the user's social category user profile headers in the collection.

Alternatively, the user may want to maintain separate social category user profile headers on their respective user terminals and may opt out of implementing the synchronization function.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may are capable of voice telephone communications through the network 15, and for the social category customization application services, the example of devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the user terminals 13 via the Internet 23 may be with devices like those shown at 25 and 27 as well as with a variety of other types of devices or systems capable of data communications through various interconnected networks. The mobile stations 13a and 13 of users of the social category customization application service also can receive and execute applications written in various programming languages, as discussed more later.

User terminals 13 can take the form of portable handsets, smart-phones or personal digital assistants, although they may be implemented in other form factors. Program applications, including an application to assist in the social category customization application service can be configured to execute on many different types of user terminals 13. For example, a mobile station application can be written to execute on a binary runtime environment for mobile (BREW-based) mobile station, a WINDOWS MOBILE based mobile station, ANDROID, I-Phone, Java Mobile, or RIM based mobile station such as a BLACKBERRY or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving user terminals 13, can include one or more RANs and a regional circuit and/or packet switched network and associated signaling network facilities.

Physical elements of a RAN operated by one of the mobile service providers or carriers, include a number of base stations represented in the example by the base stations (BS s) 17. Although not separately shown, such a base station 17 can include a base transceiver system (BTS), which can communicate via an antennae system at the site of base station and over the airlink with one or more of the user terminals 13, when the user terminals are within range. Each base station can include a BTS coupled to several antennae mounted on a radio tower within a coverage area often referred to as a "cell." The BTS is the part of the radio network that sends and receives RF signals to/from the user terminals 13 that are served by the base station 17.

The radio access networks can also include a traffic network represented generally by the cloud at 15, which carries the user communications and data for the user terminals 13 between the base stations 17 and other elements with or through which the user terminals communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. It should be apparent, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of the application server 31.

A user terminal 13 communicates over the air with a base station 17 and through the traffic network 15 for various voice and data communications, e.g. through the Internet 23 with a server 25 and/or with application servers 31. If the mobile service carrier offers the social category customization application service, discussed herein is provided for download (e.g., via purchase from an app store or some other application provider) by a carrier operated application server 31, for communication via the networks 15 and 29. Also, provided in the overall network 10 are one or more content servers 35, which provide access to websites/applications and webpages that allow the user to post to message boards. Alternatively, the social category customization application service may be provided by a separate entity (alone or through agreements with the carrier), in which case, the service may be provided for download by an application server such as server 25 connected for communication via the networks 15 and 23. In addition, one or more content servers 26 provide access to websites/applications and webpages that allow the user to post to message boards. Server such as 25 and 31 may provide any of a variety of common application or service functions in support of or in addition to an application program running on the mobile station 13. However, for purposes of further discussion, we will focus on functions thereof in support of the social category customization application service. For a given service, including the social category customization application service, an application program within the mobile station may be considered as a 'client' and the programming at 25 or 31 may be considered as the 'server' application for the particular service.

To insure that the social category customization application service offered by server 31 is available to only authorized devices/users, the provider of the social category customization application service also deploys an authentication server 33. The authentication server 33 could be a separate physical server as shown, or authentication server 33 could be implemented as another program module running on the same hardware platform as the server application 31. Essentially, when the application server (server 31 in our example) receives a service request from a client application on a mobile station 13, the server application provides appropriate information to the authentication server 33 to allow application server 31 to authenticate the mobile station 13 as outlined herein. Upon successful authentication, the server 33 informs the application server 31, which in turn provides access to the social category customization application service via data communication through the various communication elements (e.g. 29, 15 and 17) of the network 10. A similar authentication function may be provided for social category customization application service(s) offered via the server 25, either by the server 33 if there is an appropriate arrangement between the carrier and the operator of server 25, by a program on the server 25 or via a separate authentication server (not shown) connected to the Internet 23.

In an example, a browser application executing on a terminal device notifies a social category customization application executing on the application server 31 or 25 of the webpage being accessed. For example, the notification may include the uniform resource locator of the webpage being accessed by the browser application on the user terminal. In response to the notification the user terminal browser application receives from the social category customization application a social category user profile header for replacing instances of user profile headers of the other users whose postings are in the message board of the webpage.

In another example, the social category customization application when executed causes the user terminal, determines that the webpage is a webpage that supports social category user profile headers. Upon making the determination, the social category customization application causes a request to be transmitted to an application server associated with the social category customization application. The request includes an address (e.g., a uniform resource locator or the like) to an application server, such as application server 25 or 31. The application server 25 or 31 maintains a listing of social category user profile header information of the user terminal device user. In response to the request, the social category customization application receives social category user profile header information of other users associated with the address of the webpage. The Social category customization application in response to receiving the social category user profile header information of other users provides the social category user profile header information of the other users to the browser application. The browser application incorporates into the message boards presented in the graphical user interface.

In yet another example, a user may be able to pre-select certain users to receive a posting to a message board. A user, prior to posting a message via a graphical user interface selects from a menu of social category indicators (accessed via a link or in a menu that is presented along with the message board), such as that illustrated in FIG. 2C, a social category indicator of users that the user desires to receive their posting. For example, the user may only want pet owners to receive a posting directed to a type or brand of pet food. A benefit of this feature is that the user does not have to find a website/application or webpage related to pet food, but simply selects from users on a message board that have a similar social category of interest. Continuing with the example, the social category customization application receives, via the graphical user interface, an indication that the user has selected a social category indicator presented in the menu. In response to the indication, the social category customization application determines a type of the social category of the selected social category indicator (e.g., pet owner). In response to the determination, the social category customization application generates instructions that are delivered to the social category customization application server to permit only users having the selected social category indicator in their social category user profile header to receive and/or respond to the posted message. The social category customization application server may return a confirmation of the instructions or the like.

In an example of the implementation of the social category customization application service described herein, the social category customization application, social category user profile header and related information may be implemented using one or more of application server 31 or third-party application server 25. The respective user terminals, such as 13a and 13b, after completion of the generation of their respective social category user profile headers transmit the social category user profile headers to the respective application server 31 responsible for maintaining the social category customization application. When the respective user terminal is attempting to connect to a webpage that has message board posting functionality, the application server 31 determines that the user terminal is also executing the social category customization application. Based on the determination, the application server 31 when providing the message board postings of the webpage to the user terminal also delivers the social category user profile headers that correspond to postings in the message board. For example, as shown in FIG. 3A, a number of different users have posted messages (i.e. postings 315-355) on the message board presented in the graphical user interface 395. When the illustrated message board is provided to the user terminal by the application server 31, the application server 31 replaces the code for the presentation of the standard user profile header for the webpage with code for the presentation of the social category user profile header of the social category customization application. As a result, all of the postings that are provided by an active user of the social category customization application include the user's social category user profile header. An "active" user is a user that has the social category customization application launched or executing in the background of a user terminal, so the user can receive messages from other user's while the active user is on-line. Alternatively or in addition, an "active user" is a user that has registered with the social category customization application hosted by an application server, such as application server 31 or 25, to allow use of a respective user's social category user profile header for all or some postings with a message board regardless of whether the user is on-line or not.

The enhanced social category customization application service under consideration here may be delivered to touchscreen type user terminals as well as to non-touch type user terminals. Hence, our simple example shows the user terminal 13b as a touchscreen type mobile station. Implementation of the on-line social category customization application service may involve at least some execution of programming in the user terminals as well as implementation of user input/output functions and data communications through the network 15, from the user terminals.

It may be useful to consider the functional elements/aspects of an example of a user terminal, such as user terminal 13b, at a high-level. Computer type user terminals, such as laptop PC 27, will be described later with respect to FIG. 7.

Figure 5:
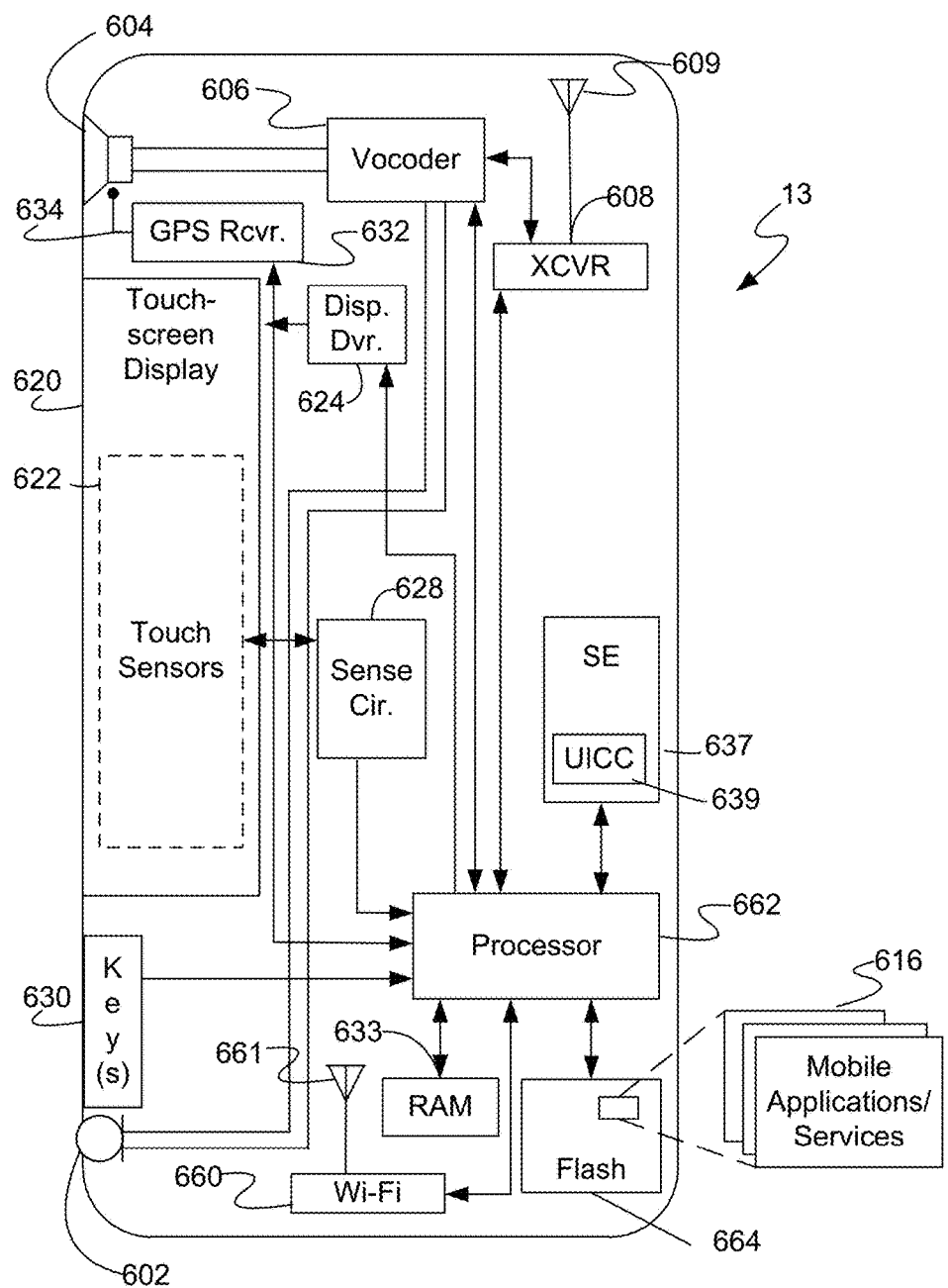
FIG. 5 is a high-level functional block diagram of an example of touchscreen type user terminal device that may utilize the customized social category indicators service through a network/system like that shown in FIG. 4.

For purposes of such a discussion, FIG. 5 provides a block diagram illustration of an example of a user terminal 13, such as a touchscreen type mobile device.

FIG. 5 provides a block diagram illustration of an example of a touchscreen type mobile device 13 as the user terminal discussed in the examples. Although the mobile device 13 may be a tablet or may be incorporated into another device, such as a personal digital assistant (PDA) or the like, for discussion purposes, the illustration shows the mobile device 13 is in the form of a handheld smartphone. The mobile device 13 functions as a normal digital wireless telephone device. For that function, the device 13 includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications.

For digital wireless communications, the mobile device 13 also includes at least one digital transceiver (XCVR) 608 for digital wireless communications via a wide area wireless mobile communication network, although the mobile device 13 may include additional digital or analog transceivers (not shown). The transceiver 608 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information including digitized audio signals, still image and/or video signals, web page information for display as well as web-related inputs (e.g., user postings to a message board), and various types of mobile message communications to/from the mobile device 13.

The transceiver 608 provides two-way wireless communication of information, such as vocoded speech samples and/or digital information for data communications (including for authentication), in accordance with the technology of the networks of FIG. 5. The transceiver 608 also sends and receives a variety of signaling messages in support of the various voice and data services provided via the mobile device 13 and the communication network. Each transceiver 608 connects through RF send and receive amplifiers (not separately shown) to an antenna 609. A mobile device 13 may include a variety of different types of user interface elements. The mobile device 13 includes a display 620 for displaying messages, menus or the like, call related information dialed by the user, calling party numbers, etc., including the described for the mobile device video calling upgrade service. For output purposes, the touchscreen 620 includes a display screen, such as a liquid crystal display (LCD) or the like. For example, the touchscreen display 620 is used to present information (e.g., text, video, graphics or other visible digital media content) to the user of mobile device 13. Processor 662 controls visible display output on the LCD or other display element of the touchscreen display 620 via a display driver 624, to present the various visible outputs to the device user. In general, touchscreen display 620 and touch sensors 622 (and one or more keys 630, if included) are used to provide the textual and graphical user interface for the mobile device 13. In an example, touchscreen display 620 provides viewable content to the user at mobile device 13. Touchscreen display 620 also enables the user to interact directly with the viewable content provided in the content display area, typically by touching the surface of the screen with a finger or an implement such as a stylus. Other interface elements may include a keypad including one or more keys 630. For example, the keypad may be implemented in hardware as a T9 or QWERTY keyboard of mobile device 13 and keys 630 may correspond to the physical keys of such a keyboard. Alternatively, keys 630 (and keyboard) of mobile device 13 may be implemented as "soft keys" of a virtual keyboard graphically represented in an appropriate arrangement via touchscreen display 620. The soft keys presented on the touchscreen display 620 may allow the user of mobile device 13 to invoke the same user interface functions as with the physical hardware keys. Keys 630 or a virtual keyboard presented via the touchscreen display 620 may enable dialing digits for voice and/or data calls as well as generating selection inputs, for example, as may be keyed-in by the user based on a displayed menu or as a cursor control and selection of a highlighted item on a displayed screen. The touchscreen display 620 and keys 630 are the physical elements providing a textual or graphical user interface. Various combinations of the keys 630, touchscreen display 620, microphone 602 and speaker 604 may be used as the physical input output elements of the graphical user interface (GUI), for multimedia (e.g., audio and/or video) communications including communications/interactions related to implementing the social category indicator selection and social category user profile header functions implemented via the social category customization application as well as accessing websites/applications and webpages via the browsing application and facilitating user postings to message boards of the respective websites/applications or webpages. Of course other user interface elements may be used, such as a trackball, as in some types of PDAs or smart phones.

Figures 6, 7:
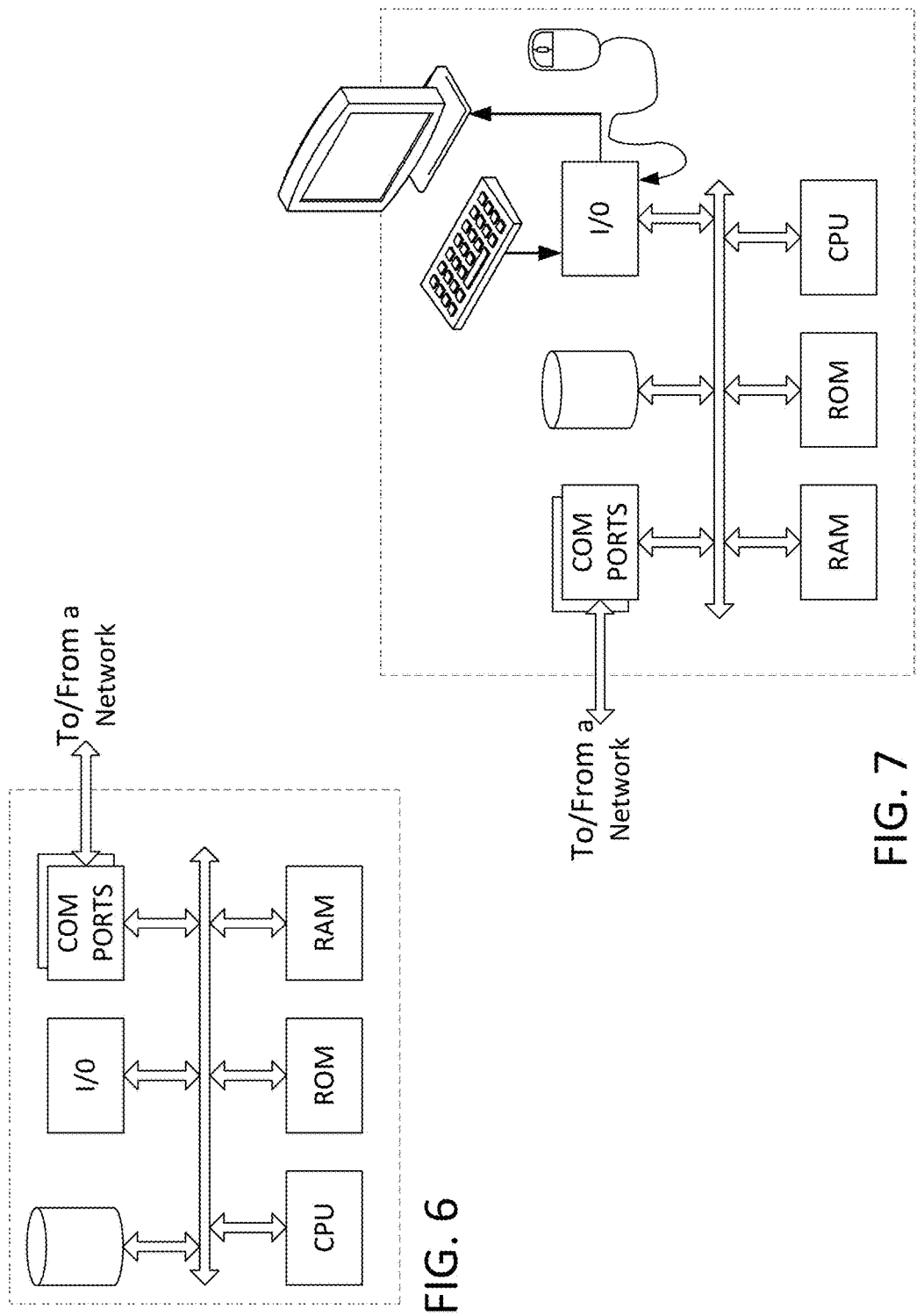
FIG. 6 is a simplified functional block diagram of a computer that may be configured as a host or server, for example, to function as the application server in the system of FIG. 4.
FIG. 7 is a simplified functional block diagram of a personal computer, work station, or user terminal device.

As shown in FIG. 6, the mobile device 13 also includes a sense circuit 628 coupled to touch sensors 622 for detecting the occurrence and relative location/position of each touch with respect to a content display area of touchscreen display 620. In addition, the sense circuit 628 is configured to provide processor 662 with touch-position information based on user input received via touch sensors 622 (e.g. a user interface element). In some implementations, processor 662 is configured to correlate the touch position information to specific content being displayed within the content display area on touchscreen display 620. The touch-position information captured by sense circuit 628 and provided to processor 662 may include, but is not limited to, coordinates identifying the location of each detected touch with respect to the display area of touchscreen display 620 and a timestamp corresponding to each detected touch position.

In addition to normal telephone and data communication related input/output, the user interface elements also may be used for display of menus and other information to the user and user input of selections, including any needed during user selection of a menu option. For example, if used as a selection device, the user interface elements allow a user to select the different cellular carrier proprietary feature services and applications inputs.

The touchscreen display 620 and other input devices is used to present various prompts and status information regarding the social category customization examples discussed above as well as to receive inputs regarding user selections and obtaining user information. Using the touchscreen display 620, a user selects the various inputs, e.g., "YES" or "NO" buttons for confirming the joining of a carrier network, or selects an icon for applications enabled via the social category customization examples.

A microprocessor 662 serves as a programmable controller for the mobile device 13, in that it controls all operations of the mobile device 13 in accord with programming that it executes, for all normal operations, and for operations involved in the social category customization application service under consideration here. The microprocessor 662 also configures the mobile device 13 to perform various operations, for example, in accordance with instructions or programming executable by microprocessor 662.

For example, such operations may include various general operations of the mobile device 13 as well as operations related to confirming or adjusting operational settings of the mobile device 13, contacting network devices, storing user preference information, controlling encoding/decoding of voice and video data, and the like. A microprocessor, or generally, a processor, is a hardware circuit having elements structured and arranged to perform one or more processing functions, typically various data processing functions. Although discrete logic components could be used, the examples utilize components forming a programmable central processing unit (CPU). A microprocessor for example includes one or more integrated circuit (IC) chips incorporating the electronic elements to perform the functions of the CPU. The microprocessor 662, for example, may be based on any known or available microprocessor architecture, such as a Reduced Instruction Set Computing (RISC) using an ARM architecture, as commonly used today in mobile devices and other portable electronic devices. Of course, other microprocessor circuitry may be used to form the CPU or processor hardware in server computers or other user terminal computer equipment.

Although a processor may be configured by use of hardwired logic, typical processors in mobile devices are general processing circuits configured by execution of programming. The microprocessor 662 connects to other elements of the mobile device 13 via appropriate circuitry, such as bus or terminal connections. In a present example, the mobile device 13 includes flash type program memory 664, for storage of various "software" or "firmware" program routines such as device operating system (OS), voice encoding/decoding algorithms, video encoding/decoding algorithms, programs related to graphical user interface elements and functions. The memory 664 also stores mobile configuration settings, such as the MDN, the IMEID and/or mobile identification number (MIN), etc. The mobile device 13 may also include a non-volatile random access memory (RAM) 633 for a working data processing memory. Of course, other storage devices or configurations may be added to or substituted for those in the example. The memories 664, 633 also store various data, such as telephone numbers and server addresses, downloaded data such as multimedia content, and various data input by the user. Programming stored in the flash type program memory 664, sometimes referred to as "firmware," is loaded into and executed by the microprocessor 662. The logic implemented by the processor 662 of the mobile device 13 configures the processor 662 to control various functions as implemented by the mobile device 13. The logic for a processor 662 may be implemented in a variety of ways, but in our example, the processor logic is implemented by programming for execution by the processor 662. Regular operations of the device are controlled by operation of the processor 662.

There are various ways that a mobile device 13 may be configured to obtain information with respect to current location of the device. In our example, the mobile device 13 includes a global positioning satellite (GPS) receiver 632 and associated antenna 634. In some examples, the social category customization application is configured, according to user preference settings, to use location information obtained from the GPS receiver 632, a social category user profile header may be updated with a social category indicator that is representative of a user's general location (e.g., city or state). Of course, the user may opt-in or opt-out of such a feature. The use of location information provides additional relevancy and context to comments and replies. For example, in the restaurant recommendations example of FIG. 3B, the user "WhoaCowboy" may be located in Washington, D.C., in which case, "WhoaCowboy" would be more likely to take a recommendation of a local person opposed to a user that is located in Maine. As mentioned in an example above, the social category user profile header may update based on certain criteria. One of the social category user profile header update criteria may be location. In such an example, as the user travels the user's social category user profile header may update to include social category indicators that are more relevant to the user's location. For example, in the case of a New York City business professional user, the social category indicators of the user's social category user profile header may include social category indicators that are more business related, while the user device is located in the New York City metropolitan region. However, as the user travels to upstate New York for vacation and out of pre-set boundaries (e.g., 50 miles, 5 miles or some other setting within the application) of the New York City metropolitan region, the social category indicators may indicate leisure activities, such as golfing, fishing and wine tasting or the like.

As outlined above, the mobile device 13 includes a processor, and programming, such as mobile application(s)/service(s) 616 (such as browser applications and social category customization application), stored in the flash memory 664 configures the processor so that the mobile device is capable of performing various desired functions, including in this case the functions involved in the technique for providing social category customization application services. In an example, the mobile applications 616 are the social category customization application services and browser applications discussed above, in which selected ones of the mobile applications 616 are enabled based on cellular carrier that provided the UICC 639. As discussed above in one or more of the example, the mobile application files 616 may include social category user profile header and information related to the use of the social category customization application and downloads may be stored in flash memory 664. This additional user data, such as the social category user profile header, and information may be made available by the processor 662 when the user switches from one webpage message board to another webpage message board. For example, the user data and information may be stored in a location of the flash memory for later retrieval by the processor 662 during the transition to the other webpage.

As an alternative to storing the social category customization application and related programming in the memory 664, the social category customization application and related programming may be stored in a secure memory location. The secure memory location, for example, is a memory location that only certain applications, such as the social category customization application, are permitted to access. For example, the secure memory location may be a portion of memory in a secure element 637 of the mobile device 130, for example, it may be a memory location incorporated in the UICC 639 of the mobile device 13. Alternatively, encrypted files containing the social category user profile header and applications (which may also be encrypted) may be stored in the memory 664, and the encryption keys and memory location address of the encrypted files may be stored in the SE 637. Alternatively, the encryption keys and memory location addresses may be stored on the UICC 639.

The mobile device 13 includes applications 110, which includes social category customization application 616, basic feature services 133, proprietary feature services 135, libraries 137, which may be stored in mobile device memory 664 and/or secure element 637. The social category customization application 616 executes on a processor (described in more detail with respect to FIGS. 6 and 7) of the mobile device 13.

The mobile device 13 also includes secure data storage. For example, the secure memory of the SE 637 may contain applications, including the social category customization application, that run inside the secure processor and may provide secure storage for data used by various applications such as applications 110, of the mobile device 13.

For example, the SE 637 secure memory may include various user account information, such as account number, user identification, a personal identification number (PIN), user social category indicator information, or the like for user verification and possibly account balance and/or transaction record information. In various examples, the secure element may be part of a UICC 639. The UICC 639 may be inserted into an interface configured to establish electrical contact with a universal integrated circuit card for communicating data to the processor 662. The UICC 639 interface may be in a location within the mobile device 13, and may be or may incorporate a SIM card. In one example, the SE 637 is separate chip that includes a secure processor, a tamper-proof storage and a memory, and is configured to communicate with feature services (proprietary or base) and applications executing on the processor 662.

The structure and operation of the mobile device 13, as outlined above, were described to by way of example, only.

In a more specific example, the social category customization application may have access to location information, on-line browsing activity information or other user activity information (e.g., calendar, or social networking site information). The social category customization application may include functionality to obtain and parse such information to determine location, details of the on-line activity or upcoming events (e.g., attendance at a concert) Using the parsed location and/or activity information, the social category customization application includes functions that may offer the user an option to update a social category user profile header based on the parsed information. Or, the social category customization application may receive updates to the social category indicators, for example, a new indicator may be added or an old one may be replaced, and in response to a message from an application server (e.g., 31 or 25 of FIG. 4), the social category customization application presents a prompt to update current social category user profile headers.

As shown by the above discussion, functions relating to the operation of the mobile device experience for the implementation of different functions, such as social category customization application service may be performed, via a graphical user interface of a mobile device, may be implemented on computers connected for data communication via the components of a packet data network, operating as a user device and/or as a server as shown in FIG. 4. A mobile device has been discussed above relative to FIG. 5, and a computer implemented user terminal device is shown in FIG. 7. Although special purpose devices may be used as hardware platforms for servers, such devices also may be implemented using one or more hardware platforms intended to represent a general class of data processing device commonly used to run "server" programming so as to implement the social category customization application functions and website/application with message board functions discussed above, albeit with an appropriate network connection for data communication.

The software functionalities involve programming, including executable code as well as associated stored data, e.g., files used for the social category customization application functions. The software code is executable by the general-purpose computer hardware that functions as the application server and/or that functions as a user terminal device. In operation, the code is stored within the mobile device or general-purpose computer hardware platform. At other times, however, the software may be stored at other locations and/or transported for loading into the appropriate general-purpose computer system. Execution of such code by a processor of the respective hardware platform enables the platform to implement the methodology for social category customization application functions, in essentially the manner performed in the implementations discussed and illustrated herein.

FIGS. 6 and 7 provide functional block diagram illustrations of general purpose computer hardware platforms. FIG. 6 illustrates a network or host computer platform, as may typically be used to implement a server, such as the application server in FIG. 4. A computer with user interface elements as depicted in FIG. 7 may be used to implement a personal computer or other type of work device or terminal device, although the computer of FIG. 7 may also act as a server if appropriately programmed. It is believed that the general structure and general operation of such equipment as shown in FIGS. 6 and 7 should be self-explanatory from the high-level illustrations.

A computer running a server program, for example, includes a data communication interface for packet data communication. The server also includes a CPU, in the form of one or more processor circuits, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface, one or more processor circuits implementing the CPU functionality, main memory and one or more mass storage devices for storing user data and the various executable programs (see FIG. 7). A mobile device type user terminal may include similar elements, but will typically use smaller components that also require less power, to facilitate implementation in a portable form factor (see e.g. FIG. 5). The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of social category customization application service for enabling social category customization application outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile device manufacturer or cellular carriers into the computer platform of the respective cellular carriers that will be the activation or self-activation server or a third party server that provides the social category customization application service for enabling implementation of the social category user profile header. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the examples of the social category customization application, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A user terminal device, comprising:
a memory; and
a processor, coupled to the memory, to:
receive social category information to associate with a plurality of user profile headers of a user associated with the user terminal device,
the social category information including:
information determined based on responses to questions by the user,
information identifying characteristics associated with a personality of the user, or
information identifying a social status of the user;
automatically generate, based on the social category information, the plurality of user profile headers to be posted along with a user generated message on one or more websites,
each of the plurality of user profile headers including:
a user indicator, and
one or more social category indicators,
each of the one or more social category indicators being searchable, and
each of the one or more social category indicators identifying one or more traits of the user, and
each of the plurality of user profile headers including a different set of the one or more social category indicators;
associate each of the plurality of user profile headers with a corresponding website, of a plurality of websites, based on content provided by the plurality of websites;
receive information indicating that the user is providing the user generated message to a message board of a particular website of the plurality of websites;
determine a particular user profile header, of the plurality of user profile headers, that corresponds to the particular website; and
cause, via an application programming interface (API) of the particular website, the particular user profile header to be substituted for a standard user profile header and presented with the user generated message in the message board of the particular website, the standard user profile header not including one or more functionalities provided by the particular website.

2. The user terminal device of claim 1, where the processor is further to:
provide, for presentation, the questions to the user,
the questions pertaining to the one or more traits of the user;
receive the responses to the questions from the user; and
determine the information, determined based on the responses to the questions, to include in the social category information.

3. The user terminal device of claim 1, wherein the one or more traits of the user include one or more of:
a hobby of the user,
a demographic of the user,
professional interests of the user, or
a social stature of the user.

4. The user terminal device of claim 1, where the processor is further to:
provide, for presentation, a user interface for receiving the information identifying the characteristics associated with the personality of the user; and
receive the information identifying the characteristics associated with the personality of the user via the user interface.

5. The user terminal device of claim 1, wherein the message board includes messages from a plurality of other users associated with modified user profile headers presented in the message board of the particular website.

6. The user terminal device of claim 1, wherein the one or more social category indicators are first social category indicators; and
wherein the processor is further to:
receive a selection of one or more second social category indicators to be included in the particular user profile header; and
cause, based on the selection, only the one or more second social category indicators, in the particular user profile header, to be presented with the user generated message in the message board.

7. The user terminal device of claim 1, wherein the processor is further to:
cause the user generated message to be provided for presentation to only a plurality of other users that are associated with the one or more social category indicators.

8. The user terminal device of claim 1, wherein each of the one or more social category indicators is an icon corresponding to one of the one or more traits of the user.

9. A method, comprising:
receiving, by a user terminal device, social category information to associate with a plurality of user profile headers of a user associated with the user terminal device,
the social category information including:
information determined based on responses to questions by the user,
information identifying characteristics associated with a personality of the user, or
information identifying a social status of the user;
automatically generating, by the user terminal device and based on the social category information, the plurality of user profile headers to be posted along with a user generated message on one or more websites,
each of the plurality of user profile headers including:
a user indicator, and
one or more social category indicators,
each of the one or more social category indicators identifying one or more traits of the user, and
each of the plurality of user profile headers including a different set of the one or more social category indicators;
associating, by the user terminal device, each of the plurality of user profile headers with a corresponding website, of a plurality of websites, based on content provided by the plurality of websites;
receiving, by the user terminal device, information indicating that the user is providing the user generated message to a message board of a particular website of the plurality of websites;
determining, by the user terminal device, a particular user profile header, of the plurality of user profile headers, that corresponds to the particular website; and
causing, by the user terminal device and via an application programming interface (API) of the particular website, the particular user profile header to be substituted for a standard user profile header and presented with the user generated message in the message board of the particular website,
the standard user profile header not including one or more functionalities provided by the particular website.

10. The method of claim 9, further comprising:
providing, for presentation, the questions to the user,
the questions pertaining to the one or more traits of the user;
receiving the responses to the questions from the user; and
determining the information, determined based on the responses to the questions, to include in the social category information.

11. The method of claim 9, wherein the one or more traits of the user include one or more of:
a hobby of the user,
a demographic of the user,
professional interests of the user, or
a social stature of the user.

12. The method of claim 9, further comprising:
providing, for presentation, a user interface for receiving the information identifying the characteristics associated with the personality of the user; and
receiving the information identifying the characteristics associated with the personality of the user via the user interface.

13. The method of claim 9, further comprising:
providing, to a server device, the plurality of user profile headers, and information identifying an association between each of the plurality of user profile headers and the corresponding website.

14. The method of claim 13, further comprising:
providing, to the server device, a notification indicating the particular website to which the user is providing the user generated message; and
receiving, from the server device and based on the notification, one or more user profile headers of the other users.

15. The method of claim 9, wherein the message board includes messages from a plurality of other users associated with modified user profile headers presented in the message board of the particular website.

16. The method of claim 9, wherein the one or more social category indicators are first social category indicators; and
wherein the method further comprises:
receiving a selection of one or more second social category indicators to be included in the particular user profile header; and causing, based on the selection, the one or more second social category indicators, in the particular user profile header, to be presented with the user generated message in the message board.

17. The method of claim 9, further comprising:

causing the user generated message to be provided for presentation to only a plurality of other users that are associated with the one or more social category indicators.

18. The method of claim 9, wherein each of the one or more social category indicators is an icon corresponding to one of the one or more traits of the user.

19. The method of claim 9, further comprising:

receiving a selection of a selected user profile header of the plurality of user profile headers; and causing the selected user profile header to be provided for presentation with the user generated message in the message board of the particular website.

20. A non-transitory computer-readable medium storing instructions, the instructions comprising:

one or more instructions that, when executed by one or more processors, cause the one or more processors to:

receive social category information to associate with a plurality of user profile headers of a user associated with a user device, the social category information including:

information determined based on responses to questions by the user, information identifying characteristics associated with a personality of the user, or information identifying a social status of the user;

automatically generate, based on the social category information, the plurality of user profile headers to be posted along with a user generated message on one or more websites, each of the plurality of user profile headers including:

a user indicator, and one or more social category indicators, each of the one or more social category indicators identifying one or more traits of the user, and each of the plurality of user profile headers including a different set of the one or more social category indicators;

associate each of the plurality of user profile headers with a corresponding website, of a plurality websites, based on content provided by the plurality of websites;

receive information indicating that the user is providing the user generated message to a message board of a particular website of the plurality of websites;

determine a particular user profile header, of the plurality of user profile headers, that corresponds to the particular website; and cause, via an application programming interface (API) of the particular website, the particular user profile header to be substituted for a standard user profile header and provided for presentation with the user generated message in the message board of the particular website, the standard user profile header not including one or more functionalities provided to the particular website.

* * * * *